Aug. 11, 1964  J. C. VARKALA  3,144,159
COLLAPSIBLE BASKET
Filed June 4, 1962
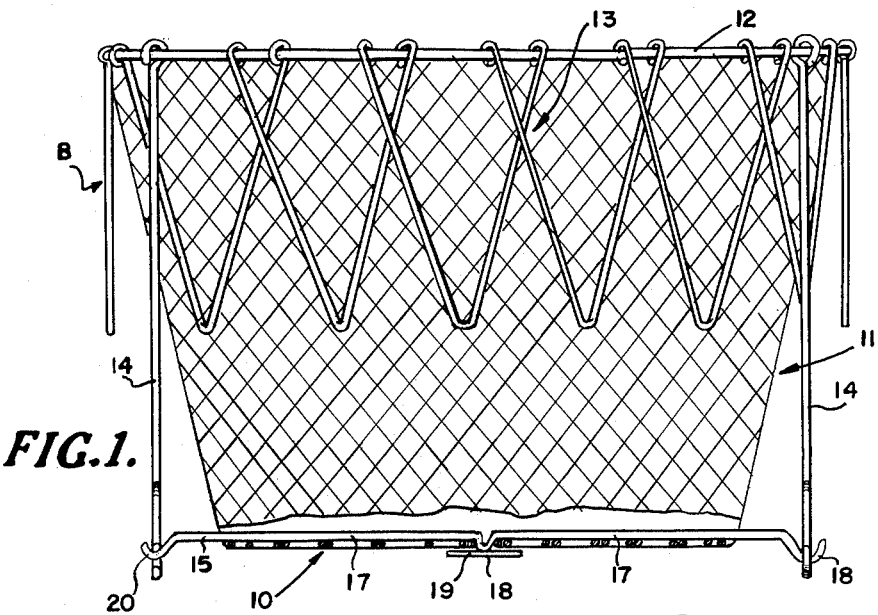
FIG.1.
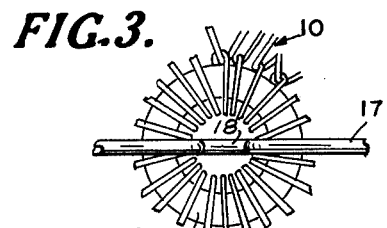
FIG.3.
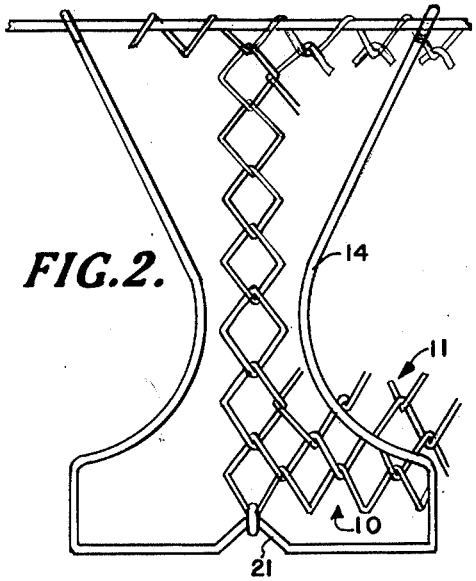
FIG.2.
FIG.4.
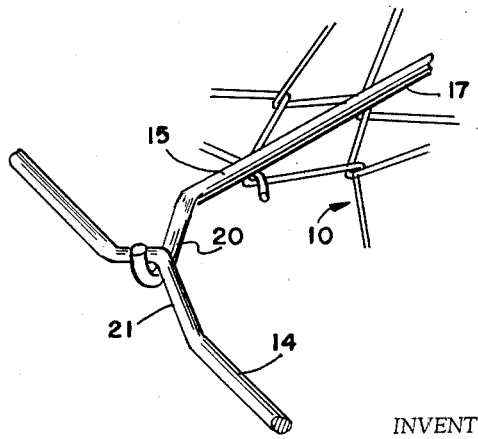
INVENTOR
JOSEPH C. VARKALA
BY Cushman, Darby & Cushman.
ATTORNEYS though/united States Patent Office 3,144,159
Patented Aug. 11, 1964

3,144,159
COLLAPSIBLE BASKET
Joseph C. Varkala, 131 Llewellyn Road,
Montclair, N.J.
Filed June 4, 1962, Ser. No. 199,878
2 Claims. (Cl. 220—6)

This invention relates to an improvement in collapsible baskets and more particularly to a device for selectively retaining a collapsible wire mesh basket in a rigid non-collapsed position.

Collapsible wire baskets for storing, serving, washing or draining fruits, vegetables, salads and the like to which the improvement applies, generally comprise a form-sustaining foraminous wire basket bottom of generally disked shape, a collapsible network of interconnecting wire links forming the basket sides extending upwardly and outwardly as an upward opening truncated cone from the outer periphery of the basket bottom, a network of wires disposed around the periphery of the top of the cone-like basket sides so that they act as an iris to cover and uncover the basket at the option of the user, and a pair of carrying handles, each of which is a partially flattened loop of wire pivotably attached at each end thereof to the top of the cone-like collapsible basket sides at spaced points around the periphery of the top. A basket of this type, when set down while it is in this orientation, collapses to a generally flat disk shape. However, when a user desires to set a basket of this type on a surface such as a table and have it remain in the containing orientation, i.e., uncollapsed, the handles may be pivoted from the upward carrying position to a downward supporting position with respect to the basket sides, so that the central portion of each of the partially flattened loop-like handles extends downward beyond the bottom of the basket. The handles which are now feet may be placed on a surface, so that the basket is suspended in a containing position by the supporting feet.

However, when a basket of this general structure and purpose has been loaded with relatively heavy objects, such as fried meat or french-fried potatoes, and the handles have been pivoted into their downward, supporting position, and the basket has been placed on a supporting surface such as a table, the legs have a great tendency to slide from their supporting position under the influence of the weight of the contents of the basket, in combination with the smoothness of the surface of the supporting surface. In sliding, the handles (legs) pivot upwardly and allow the basket to collapse, dumping and spilling the contents of the basket, much to the chagrin of the user.

It is, therefore, an object of this invention to provide an improvement in the construction of collapsible wire baskets which will allow the users to selectively rigidly secure the baskets in their non-collapsed, containing position.

It is also an object of this invention to provide an improvement in the construction of collapsible wire baskets of the type described that will greatly enhance the usefulness and saleability of such baskets without adding significantly to their cost or difficulty of manufacture.

These and other objects of this invention will become more clear during the course of the following specification and the appended claims.

The invention may best be understood with reference to the accompanying drawing in which an illustrative embodiment is shown.

In the drawing:

FIGURE 1 is a side elevation view of a collapsible wire basket showing the improvement of my invention retaining the basket in its uncollapsed containing position;

FIGURE 2 is a fractional elevation view of the basket of FIGURE 1 showing the handle, basket side and retainer latch detail;

FIGURE 3 is an enlarged plan view of the central position of the interior of the basket bottom; and FIGURE 4 is an enlarged perspective view showing the engagement of the retainer latch and a handle of the basket.

Referring now more particularly to the drawings as best shown in FIGURE 1, the improved collapsible wire basket B is comprised of a wire mesh basket bottom 10 of generally disked shape, collapsible wire mesh side walls 11 extending upwardly from the outer periphery of the basket bottom 10, a circular ring 12 secured along its circumference to the upper edge of the collapsible wire mesh side walls, providing a shape-retaining means for the mouth of the basket, a network of wires 13 secured to the ring 12 throughout the circumference thereof so that they act as an iris-like closure for the basket, a pair of handles 14 pivotably secured to the ring 12 so that they are rotatable about axes lying in the plane of the ring 12, i.e., a horizontal plane, to become supporting legs for the basket, a rod-like latch member 15 including a shank portion 17 which extends adjacent the interior of the basket bottom 10, a dimple portion 18 in the center of the shank portion, said dimple extending through the bottom of the basket and being secured to a retaining bottom 19 as by soldering and latch portions 20 which removably engage the handles 14 to secure the basket in an uncollapsible position (FIGURE 4). The latch member 15 which in the embodiment shown is formed from a single piece of wire protrudes outwardly at each end thereof through the side walls of the basket at the point of the attachment of the side walls to the basket bottom 10. A hook type latch 20 is formed in the outer extremities of the latch member 15. These latches 20 may be selectively operably engaged with a keeper portion 21 in the flattened central portion of each handle 14 when the handles are in their downward supporting position and extend below the bottom 10 of the basket.

In the operation of the improved collapsible basket including the latch member 15, the user, wishing to transport the basket in its uncollapsed orientation or place the basket on a surface such as a table while having the assurance that the basket will not collapse and spill its contents, simply rotates the carrying handles downward into their supporting position so that the flattened central sections of the handles including the keeper portions extend beneath the basket bottom. The user then depresses and slides each of the latches carried by the latch member into engagement with each of the keeper portions carried by each of the handles. The basket is now rigidly held in its non-collapsed position. The handles will not slide and rotate under the weight of the basket's contents resulting in the collapsing of the basket as they may in collapsible baskets that do not include the improvement described.

When the user wishes to collapse the improved basket, he depresses the latches and withdraws them from engagement with the keepers. The handles are then rotated upwardly and the wire mesh side walls can collapse.

Although the latch member has been shown with a central dimple that protrudes through the bottom of the basket and is secured in place by a bottom-like disk on the exterior of the bottom of the basket, it is contemplated that the latch member can be supported adjacent the bottom of the basket without the use of a dimple and button, as by soldering the latch member to the basket bottom or inter-weaving it with the wire mesh of the basket bottom.

Although a specific embodiment has been shown to illustrate the invention, many modifications are possible without departing from the principles of the invention

I claim:
1. A collapsible basket of the type described having a bottom, collapsible side walls extending upwardly and outwardly from the outer periphery of said bottom, loop-like handles secured to the side walls adjacent the upper edge of the side walls so that said handles are pivotable about a horizontal axis which passes through the points of securement of said handles to said basket, said handles being of such a length that they extend beneath said bottom when said handles are pivoted to their most downward position, keeper portions formed in said handles intermediate the ends thereof, a rod-like latch member secured adjacent the bottom of the basket having latches which are engageable with said keeper portions to rigidly and removably secure the collapsible wire basket in an uncollapsed position, said rod-like latch member being mounted adjacent the interior of the bottom of the basket by a dimple which is formed in the latch member, extends through a hole formed in the bottom of the basket and is secured to a button-like member that is larger than said hole, said button-like member being positioned exteriorly against the bottom of the basket.

2. A collapsible basket of the type described having a collapsible bottom and side walls formed substantially-entirely of collapsible wire mesh, said side walls extending upwardly and outwardly from the outer periphery of said bottom, loop-like handles secured to the side walls adjacent the upper edge of the side walls so that said handles are pivoted about a horizontal axis which passes through the points of securement of said handles to said basket, said handles being of such a length that they extend beneath said bottom when said handles are pivoted to their most downward position, keeper portions formed in said handles intermediate the ends thereof, and a rod-like latch member secured centrally of its length to the center of the bottom of the basket, said member having latches at its opposite ends which are engageable with said keeper portions when said member is flexed between its center and its ends, to stretch the mesh of said basket and to rigidly secure same in an uncollapsed position.

References Cited in the file of this patent
UNITED STATES PATENTS
2,812,098   Escaut _____ Nov. 5, 1957
FOREIGN PATENTS
1,237,694   France _____ June 20, 1960